April 12, 1966   F. J. WESOLOWSKI ETAL   3,246,267
TRANSFORMER WINDING WITH HIGH ZERO SEQUENCE IMPEDANCE
Filed July 29, 1963

Inventors
Frank J. Wesolowski
Melvin R. Ackerman
By W. S. Robertson
Attorney

United States Patent Office 3,246,267
Patented Apr. 12, 1966

3,246,267
TRANSFORMER WINDING WITH HIGH ZERO
SEQUENCE IMPEDANCE
Frank J. Wesolowski and Melvin N. Ackerman, Pittsburgh, Pa., assignors to Allis-Chalmers Manufacturing Company, Milwaukee, Wis.
Filed July 29, 1963, Ser. No. 298,346
4 Claims. (Cl. 336—12)

This invention relates to transformers, more specifically to a transformer winding arrangement that gives a higher impedance to fault currents than to load currents.

The impedance of a transformer at line frequency is made up of the resistance and the inductive reactance of its windings. In calculating fault currents, engineers customarily consider only the reactance. Transformer reactance is associated with the magnetic flux that flows in the space outside the iron core. More of this flux links the outermost turns than links the inner turns. This distribution of the flux produces a reactive voltage drop in the primary for which there is no corresponding induced voltage in the secondary, and it produces a reactive voltage drop in the secondary that makes the terminal voltage less than the induced voltage. The reactance of a pair of windings can be made small by physically locating their turns close together and it can be made large by physically separating the turns.

Reactance in a transformer is useful because it limits the short circuit current of the transformer and thereby makes the transformer somewhat self-protecting. However, reactance has a related undesirable effect; it gives the transformer poor regulation because the secondary terminal voltage decreases as the transformer load increases and the reactive voltage drop of the transformer increases. One object of this invention is to provide a new and improved winding arrangement that has a low impedance to load currents and a high impedance to fault currents.

In a three phase system, line to ground fault currents are what are called zero sequence currents. Ordinary load currents by contrast are made up of positive sequence components and sometimes negative sequence components. The three positive sequence components can be represented by three vectors that are equal in magnitude and exactly 120° apart. The negative sequence currents are also represented by three vectors that are equal in magnitude and spaced 120° apart, but they have the opposite phase rotation from the positive sequence vectors, and they may differ from the positive sequence vectors in phase and magnitude. The three zero sequence currents are equal in magnitude and are all in phase. Because positive sequence currents and zero sequence currents differ in phase, some circuits have infinite impedance to one phase sequence and an appreciable admittance to other phase sequence currents. An example that is important in explaining this invention is that a Y connected winding has infinite zero sequence impedance if its neutral is isolated; if the neutral is grounded, the zero sequence impedance may about equal the positive sequence impedance.

In a system with its neutral ungrounded, accidently connecting only one line to ground would not produce a fault current because the zero sequence impedance is infinite. Stated in another way, the accidental ground connection does not form a circuit. The disadvantage of such a system is that an accidental ground on one line causes the two ungrounded lines to have about 1.7 times the voltage they have when the neutral is kept at ground potential. Consequently, transformers for such systems require more insulation than transformers for a system that has its neutral grounded.

The prior art has suggested a compromise circuit. In this circuit the neutral of the transformer is connected to ground through a reactor or a resistor. Except for a zero sequence voltage drop across this impedance, the neutral is kept at ground potential. This impedance contributes to the zero sequence impedance and therefore makes the transformer somewhat self-protecting, but it does not increase the positive sequence impedance. A more specific object of this invention is to provide a new and improved transformer winding arrangement that achieves this desirable result without using a reactor or resistor.

The transformer of this invention has a delta primary and a Y secondary, each made up of two parallel parts. One of the Y connected windings has its neutral grounded and the other has its neutral isolated. This connection keeps the neutral of the grounded winding at ground potential and it limits the extent that the potential of the ungrounded neutral of the other winding can drift away from ground. Thus, this winding arrangement has the advantages of reduced insulation requirements of the prior art transformers where the neutral is connected to ground through a reactor. The windings are physically arranged on the transformer core so that each Y winding is closely coupled by leakage flux to only one delta winding and is poorly coupled to the other. The circuit can be thought of as paralleling the leakage reactance of the associated Y delta pairs to give the parallel combination only half the positive sequence reactance of the pairs that are more closely coupled by leakage flux. The grounded Y winding and the associated delta give the transformer about the same zero sequence impedance value as the positive sequence value that this pair contributes to the parallel set of windings, that is, about twice the total positive sequence impedance. The ungrounded Y does not contribute to the zero sequence admittance because it is ungrounded. The associated delta contributes very little to the zero sequence admittance because its location makes it poorly coupled to the grounded Y. Thus the transformer has good regulation and good self-protection against faults.

Figure 1:
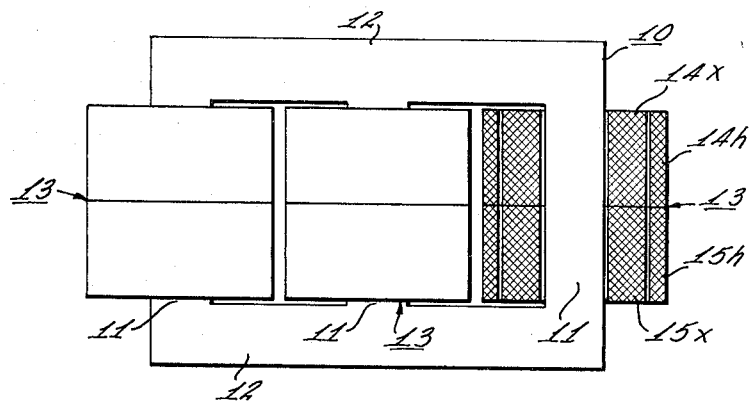
FIG. 1 is a drawing of the transformer core and coil assembly partly in section showing the relative physical location of the transformer windings.

The transformer of FIG. 1 has a core 10 with three legs 11 and two yoke pieces 12 that form a magnetic circuit for three coils 13. Each coil comprises two high voltage windings 14h and 15h and two low voltage windings 14x and 15x. Windings 14h, 14x are closely spaced together; windings 15h, 15x are closely spaced together; and pair 14h, 14x is relatively isolated from pair 15h, 15x. This physical arrangement gives the windings the reactances that will be explained later.

The transformer has two Y connected windings 21 and 22 and two delta connected windings 23 and 24. The Y windings 21, 22 are secondary windings; the delta windings 23, 24 are either primary or tertiary windings. Y connected windings 21 and 22 are connected in parallel in a three phase system of three secondary transmission lines 25. Lines 25 may be either the high voltage or the low voltage lines of the system, that is, Y windings 21, 22 may be either windings 14x, 15x or 14h, 15h in FIG.

1. The neutral 26 of winding 21 is connected to a point 27 of ground potential. The neutral 28 of winding 22 is isolated. Delta windings 23 and 24 are connected to primary system lines 29 (unless it is a tertiary and is isolated).

Because primary lines 29 do not have a discrete neutral connected to ground, zero sequence currents connot flow in lines 29. Zero sequence currents can flow inside the two deltas 23 and 24. Zero sequence currents can flow in the grounded winding 21 and in the system lines 25 and 26. Suppose that a fault occurs in the system of lines 25 and 26 that connects one line 25 to ground 27. By one method of analyzing this situation, the terminal voltages of lines 25 remain more or less balanced (except for internal voltage drops in winding 21) and the unbalanced loads on lines 25 cause more current to flow in the grounded line than in the other lines. By the method of symmetrical components the circuit can be analyzed as having zero sequence loads in addition to the normal positive and negative sequence loads. The associated zero sequence currents flow equally in the three phases of winding 21 and threefold in the ground connection 26. Both the primary (or tertiary) and the secondary contribute to the impedance even though there are no zero sequence currents in lines 29 or lines 29 are not provided. Unless a corresponding current flows in some other winding of the transformer, the flux associated with the zero sequence current would produce a reactive voltage drop that would limit the zero sequence currents in lines 25, 26 and winding 21 to an insignificant value. As is well known, a delta winding on the same core as a grounded neutral Y conducts the corresponding zero sequence currents so that the combination of winding 21 and 23 have about the same zero sequence impedance as their positive sequence impedance.

Figure 3:
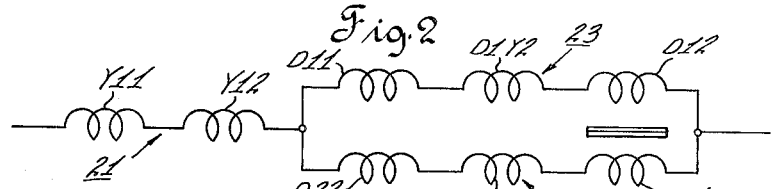
FIG. 3 is a schematic representing the zero sequence impedance of the transformer.
Figure 4:
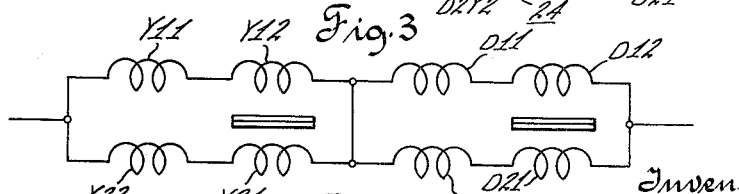
FIG. 4 is a schematic representing the positive sequence impedance of the transformer.

The ratio of the input voltage and input current is the impedance of these windings. Since the reactances are associated with flux linkages, all the reactance of one phase of the transformers can be shown in a four by four square matrix giving the flux linking windings represented by row and column headings of the matrix. The reactance of a pair of windings depends on the values of flux that links one but not both of the two windings. FIGS. 3 and 4 illustrate the reactance of the transformers with coils that represent the reactance associated with the designated flux components.

Figure 2:
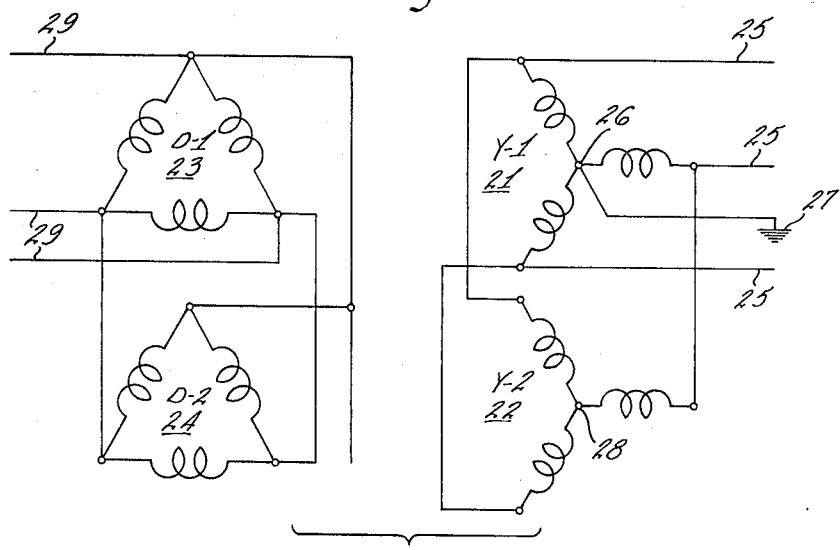
FIG. 2 is a schematic of the windings of the transformer of this invention.

Y winding 21 is designated Y–1 in FIG. 2 and its associated delta 23 is designated D–1; windings 22 and 24 are designated Y–2 and D–2. For example coil $Y_{11}$ represents the reactance associated with flux linking only winding $Y_1$; coil $Y_1$, $Y_2$ represents the reactance associated with flux that links windings $Y_1$ and $Y_2$ exclusively.

As FIG. 3 represents the zero sequence impedance of the transformer, winding Y–1 (21) is represented by a reactance $Y_{11}$, the reactance associated with flux linking only winding 21, and a reactance $Y_{12}$, the reactance associated with flux linking only windings 21 and 22. Winding Y–2 (22) is not represented because it has infinite zero sequence impedance. Delta winding 23 is represented schematically by a three reactance $D_{11}$, $D_{12}$ and $D_1$, $Y_2$. Delta winding 24 is correspondingly represented by reactances $D_{22}$, $D_{21}$ and $D_2$, $Y_2$. Reactances $D_{11}$ and $D_{22}$ are associated with flux components that link only windings 23 and 24 respectively. Reactance $D_1$, $Y_2$ and $D_2$, $Y_2$ are associated with flux components that link windings $D_1$ and $D_2$ respectively with winding $Y_2$. Reactance $D_{12}$ and $D_{21}$ are associated with flux mutually linking windings 23 and 24. There is no reactance associated with $Y_1$, $D_1$ or $D_1$, $Y_1$ because the associated fluxes produce a drop in delta winding $D_1$ and a corresponding voltage rise in winding Y–1. Similarly not shown are $Y_1$, $D_2$ and $D_2$, $Y_1$.

Comparing FIGS. 3 and 4 shows that the positive sequence circuit adds the branch containing the impedance $Y_{21}$ and $Y_{22}$ in parallel with the impedance of winding Y–1. This decreases the positive sequence impedance of the two Y windings with respect to the zero sequence impedance of FIG. 3. The circuit of FIG. 4 also removes the two impedances $D_1$, $Y_2$ and $D_2$, $Y_2$ and thereby decreases the positive sequence impedance associated with the two deltas.

As has been explained, the value of the reactances of FIGS. 3 and 4 depend on the physical spacing of the corresponding windings. As FIGS. 1 and 2 show windings 21 and 24 are as far apart as possible; and pairs 21, 23, and 22, 24 are closely spaced. This makes reactances $D_2$, $Y_1$, and $D_1$, $Y_2$ rather high and the reactances $D_1$, $Y_1$ and $D_2$, $Y_2$ rather low. Thus, as a fair approximation, the branch representing winding 24 in FIG. 3 can be ignored. With this simplification, it can be seen that FIG. 3 is approximately equivalent to a single branch of FIG. 4 and thus has twice the positive sequence impedance.

If the windings are subdivided into more parallel sections and only one of the sections has its neutral grounded, the ratio of the zero sequence impedance to the positive sequence impedance can be further increased approximately according to the number of parallel sections. The transformer shown in FIG. 1 should suggest further arrangements for winding parallel connections with low leakage flux coupling between groups and for using other well-known types of transformers. Those skilled in the art will recognize variations in the embodiment of the invention described within the scope of the claims.

Having now particularly described and ascertained the nature of our said invention and the manner in which it is to be performed, we declare that what we claim is:

1. A winding arrangement for a polyphase transformer, comprising, for each phase, a first and a second Y connected winding connected in parallel to form the secondary of the transformer, said first Y having its neutral grounded and said second Y having its neutral isolated, and a delta winding means magnetically coupled to said first and second Y windings.

2. A winding arrangement according to claim 1 in which said delta winding means comprises a first and a second delta winding connected in parallel, said first and second Y windings and said first and second delta windings being arranged for relatively good coupling between said first windings and between said second windings and relatively poor coupling between a first and a second winding.

3. A winding arrangement according to claim 2 in which said first and second delta windings are connected to form the primary of the transformer.

4. A winding arrangement according to claim 2 in which said first windings are axially displaced from said second windings on the core of the transformer.

No references cited.

ROBERT K. SCHAEFER, *Acting Primary Examiner.*